United States Patent [19]
Yang

[11] Patent Number: 5,850,439
[45] Date of Patent: Dec. 15, 1998

[54] HANDS-FREE PHONE CONVERTER

[75] Inventor: Bill Yang, Taipei City, Taiwan

[73] Assignee: Cotron Corporation, Taiwan, Taiwan

[21] Appl. No.: 604,054

[22] Filed: Feb. 20, 1996

[51] Int. Cl.$^6$ ............................................. H04M 1/00
[52] U.S. Cl. ........................... 379/395; 379/447; 379/452
[58] Field of Search ................................. 379/395, 430, 379/431, 420, 447, 452, 443, 450, 457, 438, 439, 440; D14/242

[56] References Cited

U.S. PATENT DOCUMENTS

| | | | |
|---|---|---|---|
| 299,300 | 5/1884 | Warth | 379/430 |
| 1,052,162 | 2/1913 | McCausland | 379/452 |
| 2,503,846 | 4/1950 | Shann | 379/430 |
| 3,667,569 | 6/1972 | Mackey et al. | 181/31 R |
| 4,090,042 | 5/1978 | Larkin | 379/430 |
| 4,754,484 | 6/1988 | Larkin et al. | 379/430 |
| 4,907,266 | 3/1990 | Chen | 379/430 |
| 5,191,602 | 3/1993 | Regen et al. | 379/419 |
| 5,407,113 | 4/1995 | Golliher | 224/181 |
| 5,528,689 | 6/1996 | Chan | 379/430 |

*Primary Examiner*—Dwayne D. Bost
*Assistant Examiner*—Keith Ferguson
*Attorney, Agent, or Firm*—Rabin, Champagne & Lynt, P.C.

[57] ABSTRACT

A portable hands-free telephone converter that allows a user to speak on the telephone without using the hands to hold a handset or the like. The telephone converter includes a first coupler for coupling the telephone converter to the receiver of the handset, a second coupler for coupling the telephone converter to the transmitter of the handset, a converter, coupled via the first coupling means and the second coupling means to the handset, for receiving the incoming voice from the receiver and outputting the user's voice to the transmitter, and a controller, coupled to the converter, for amplifying the user's voice signal and for amplifying the incoming voice signal received by the converter from the handset receiver.

14 Claims, 4 Drawing Sheets

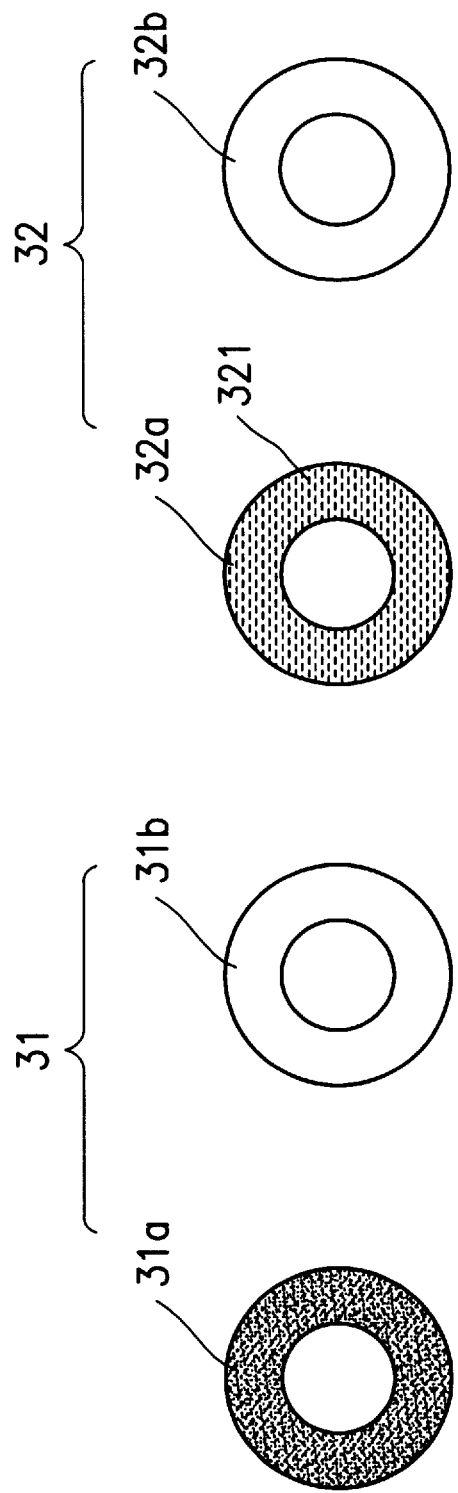

HANDS-FREE PHONE CONVERTER

BACKGROUND OF THE INVENTION

1. Field of the Invention

The invention relates to telephone converters, and more particularly, to a hands-free telephone converter that is portable and easy to mount and dismount and allows the user to speak on the telephone without using the hands to hold a handset or any part of the phone set.

2. Description of the Background Art

Commonly used telephone means include desk phones, mobile phones, cordless phones, public pay phones, and so on, which are capable of converting human voice into electrical signals to be sent via telephone links and reproduced at a remote point. Normally, such telephone means are provided with a handset on which a mouthpiece (transmitter) and an earpiece (receiver) are provided for interactive voice communication between two or more persons. Therefore, the user usually needs to use at least one of his/her hands to hold the handset while using the telephone, which makes it inconvenient for the user to do other things.

For instance, while using a desk phone set, the user would use at least one hand to hold the handset close to his/her mouth and ear. If the incoming call is, for example, a customer inquiry, this would cripple the user to some extent when the inquiry needs to be answered, for example, by searching data on a computer or flipping through document files.

In the case of a cordless telephone, although it allows the user to move around while using the telephone, the user still needs to use at least one hand to hold the phone set.

In the case of a mobile telephone in a vehicle, it is usually a dangerous practice for the user to use one hand to hold the mobile phone set and the other to hold the steering wheel while driving. It is even more dangerous if the user tries to take notes while talking on the telephone. Accordingly, there are countries now legislating laws that forbid drivers to use mobile telephones while driving on a highway.

In the case of a public pay telephone, the user uses it typically for inquiry purposes. Therefore, the user has to use one hand to hold the handset while using the other to write notes, for example, on a pocket notebook. If two hands are absolutely needed, the user might have to hold the handset between his/her chin and shoulder, which is quite an inconvenient way to talk on the telephone. Moreover, some people would avoid using the public pay telephone for fear of transmitting or receiving saliva-transmitted diseases. There exists therefore a need for a telephone converter that allows these people to use the public pay telephone in a hygienic manner.

All of the types of phone sets mentioned above are customarily not provided with volume control means. Therefore, it might be difficult for the hearing-impaired to hear clearly directly from the handset.

A conventional hands-free telephone converter that allows the user to speak on the telephone while freeing his/her hands, is provided with a loudspeaker on the receiver so as to amplify the incoming voice and then broadcast it loudly. It is a drawback of this conventional device, however, that the broadcast voice would be audible throughout an entire room so as to be heard by bystanders, even if privacy is needed. Moreover, background noise would be included in the voice being transmitted, thus deteriorating the sound quality received on the other side.

Another conventional hands-free telephone converter provides a jack on the telephone set for connection with a headset or earphone set. However, the means for connecting the headset or earphone with the telephone set should be approved by the local telecommunication authority such as the FCC (Federal Communication Commission) in U.S.A., or the FTG in Germany, in order to avoid possible interference with the telephone communication system. The requirement for such approvals would in effect add extra cost to the manufacture of the telephone converter.

SUMMARY OF THE INVENTION

It is therefore an objective of the invention to provide a hands-free telephone converter which can be mounted easily and conveniently on any telephone set.

It is another objective of the invention to provide a hands-free telephone converter which allows privacy for the user speaking on the telephone.

It is still another objective of the invention to provide a hands-free telephone converter which is provided with volume control so as to facilitate use of the telephone by the hearing-impaired.

It is yet another objective of the invention to provide a hands-free telephone converter which can be manufactured without having to apply for approvals from local telecommunication authorities.

It is still yet another objective of the invention to provide a hands-free telephone converter which is small in size, portable, and easy to mount and dismount.

In accordance with the foregoing and other objectives of the invention, a new and improved hands-free telephone converter is provided. The telephone converter comprises (a) first coupling means for coupling the telephone converter to the receiver of the handset; (b) second coupling means for coupling the telephone converter to the transmitter of the handset; (c) converting means, coupled via the first coupling means and the second coupling means to the handset, for receiving the incoming voice from the receiver and outputting the user's voice to the transmitter; and (d) control means, coupled to the converting means, for amplifying both the incoming voice signal received by the converting means from the receiver on the hand set and the user's voice signal.

BRIEF DESCRIPTION OF DRAWINGS

The invention can be more fully understood from following detailed description of the preferred embodiment thereof with references made to the accompanying drawings, wherein:

FIGS. 4A–4B show respectively the front side and the rear side of a female adhesive piece which is a part of a first coupler employed in the telephone converter; and FIGS. 4C–4D show respectively the front side and the rear side of a male adhesive piece which is another part of the first coupler employed in the telephone converter.

DETAILED DESCRIPTION OF PREFERRED EMBODIMENT

Figure 1:
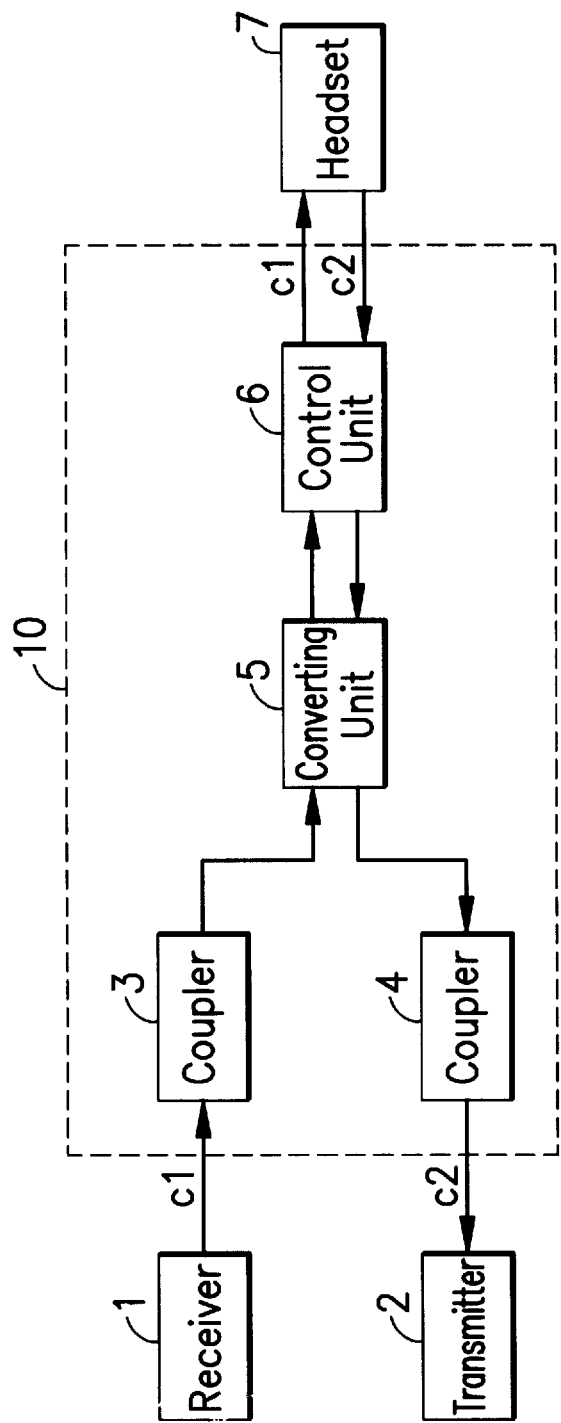
FIG. 1 is a block diagram of a hands-free telephone converter according to the invention.

Referring to FIG. 1, there is shown a block diagram of a hands-free telephone converter 10 according to the invention. The telephone converter 10 is coupled between a headset 7 and a handset 9 (see FIG. 2). The handset 9 is a conventional telephone device having a receiver 1 (the earpiece) for receiving the incoming voice signal c1 and a transmitter 2 (the mouthpiece) for transmitting the user's voice signal c2. The headset 7 allows the user to hear the incoming voice signal c1 and speak thereon so as to generate a voice signal c2 that is to be transmitted via the telephone link to the other side.

The telephone converter 10 includes a first coupler 3, a second coupler 4, a converting unit 5, and a control unit 6. The first coupler 3 is used to couple the telephone converter 10 to the receiver 1; and the second coupler 4 is used to couple the telephone converter 10 to the transmitter 2. Also, the first and second couplers 3, 4 are both coupled to the converting unit 5 which is used to convert incoming voice signal c1 from the receiver 1 and the user's voice signal c2 from the headset 7. The control unit 6 is used for volume control of the incoming voice signal c1 and also to amplify the user's voice signal c2 from the headset 7.

Figure 2:
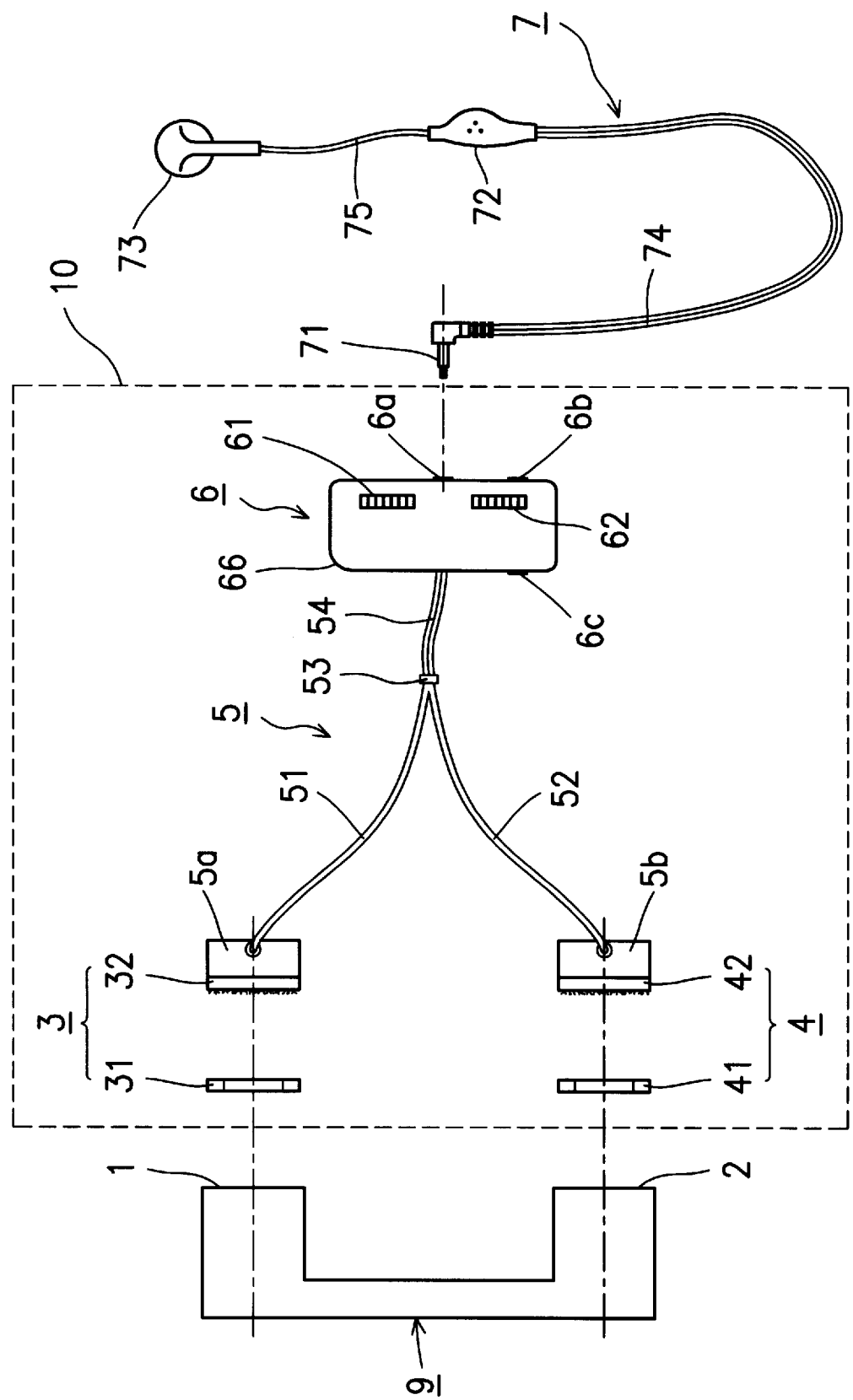
FIG. 2 is a schematic diagram showing a preferred embodiment of the hands-free telephone converter according to the invention.

Referring to FIG. 2, there is shown a practical embodiment of the telephone converter 10. The distance between the receiver 1 and the transmitter 2 of the handset 9 may be varied in different styles of the phone set. Accordingly, the first and second couplers 3, 4 on the telephone converter 10 preferably are not provided in a fixed position.

The first coupler 3 includes a female adhesive piece 31 and a male adhesive piece 32, and similarly the second coupler 4 includes of a female adhesive piece 41 and a male adhesive piece 42. The converting unit 5 includes a microphone unit 5a for picking up the incoming sound c1 from the receiver 1 of the handset 9 and a speaker unit 5b for reproducing the user's voice signal c2 for processing by the transmitter 2 of the handset 9. A wire strand 54, bifurcated at a separation point at a fastening member 53 into a first wire 51 and a second wire 52 is used to connect the microphone unit 5a and the speaker unit 5b at lateral sides thereof to the control unit 6. With the provision of the first wire 51 and the second wire 52, the mounting of the microphone unit 5a and the speaker unit 5b of the handset 9 will be unrestrained because of the variable distance between the receiver 1 and the transmitter 2 of the handset 9.

On the first coupler 3, the male adhesive piece 32 is mounted on the microphone unit 5a, and similarly on the second coupler 4, the male adhesive piece 42 is mounted on the speaker unit 5b. The microphone unit 5a can be easily coupled to the receiver 1 of the handset 9 by adhering the female adhesive piece 31 onto the receiver 1, and the speaker unit 5b can be easily coupled to the transmitter 2 of the handset 9 by adhering the female adhesive piece 41 onto the transmitter 2.

The first and second couplers 3, 4 have the same construction, so that the following description thereof is directed only to the first coupler 3. FIGS. 4A–4D shows the structure of the comprising elements of the first coupler 3, i.e., the female adhesive piece 31 and the male adhesive piece 32, in which FIGS. 4A and 4B show respectively the front side 31a and the rear side 31b of the female adhesive piece 31, and FIGS. 4C and 4D show respectively the front side 32a and the rear side 32b of the male adhesive piece 32.

As shown in FIGS. 4A–4B, the female adhesive piece 31 is a circular piece (disk) with a circular hole in the center. The rear side 31b is coated with a removable adhesive agent so as to adhere the female adhesive piece 31 onto the receiver 1 of the handset 9, whereas the front side 31a is layered with a soft material that allows the user, when directly using the handset 9 is necessary, to have a soft and thus comfortable contact of the ear with the receiver 1.

As shown in FIGS. 4C–4D, the male adhesive piece 32 is also a circular piece (disk) with a circular hole in the center which matches in shape with the female adhesive piece 31. The rear side 32b is coated with a removable adhesive agent so as to adhere the male adhesive piece 32 onto microphone unit 5a, whereas the front side 32a is provided with a plurality of hooks 321 for engagement by hooking with the front side 31a of the female adhesive piece 31. These hooks 321 allow easy disengagement of the male adhesive piece 32 from the female adhesive piece 31 by simply pulling the two pieces 31, 32 somewhat forcibly by hand. The hooks 321 and soft material of front side 31a of the female piece 31 together form a hook and loop fastener and may consist of, for example, the material known by the trademark VEL-CRO®.

The removable adhesive agent used allows the female adhesive piece 31 to be easily separated from the receiver 1 by pulling it somewhat forcibly by hand. The mounting and dismounting of the telephone converter 10 on and from the handset 9 are therefore easy to perform. The circular hole in the center of the first and second couplers 3, 4 allows easy transmission of voice waves therethrough. When the first and second couplers 3, 4 are put in position to couple the handset 9 to the converting unit 5, the male adhesive pieces 32, 42 should lay flatly on the microphone unit 5a and speaker unit 5b.

The circular hole in the center of the first and second couplers 3, 4 is not limited to the circular shape as disclosed in the foregoing. Various shapes are possible such as a square or polygon. Basically, the hole should allow unobstructed transmission of voice waves therethrough.

Referring back to FIG. 2, the control unit 6 comprises volume and tone controllers, including a volume control switch 61 and a tone control switch 62 housed in a compact casing 66 which is the main body part of the telephone converter 10. When used in conjunction with a desk phone set fixedly installed in an office or home, the casing 66 can be fixedly mounted on the phone set. On the road, the compactness of the casing 66 allows the user to put it in a pocket and carry it anywhere.

Figure 3:
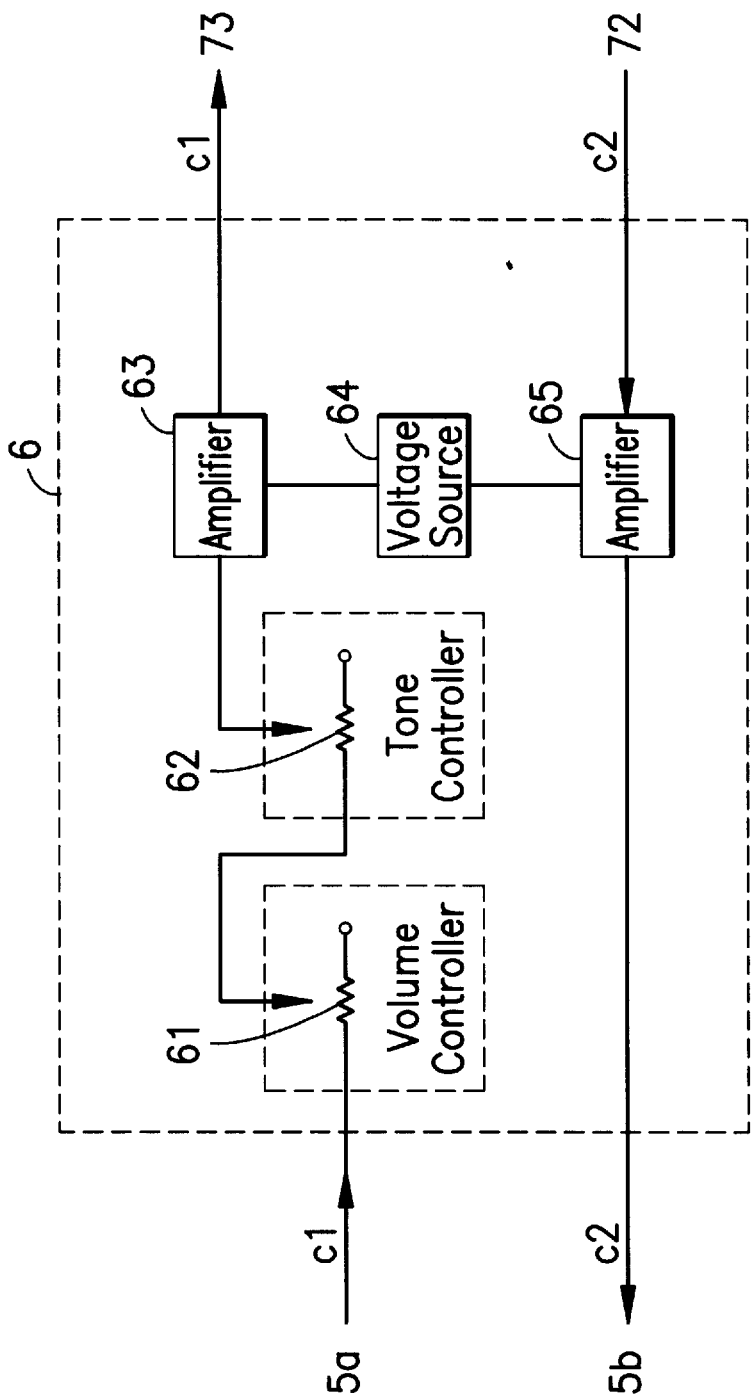
FIG. 3 is a circuit diagram of a control unit employed in the hands-free telephone converter according to the invention.

Referring also to FIG. 3, the control unit 6 receives the incoming voice signal c1 from the microphone unit 5a and transfers the user's voice signal c2 to the speaker unit 5b. The control unit 6 also includes a first amplifier 63 for amplifying the incoming voice signal c1, a second amplifier 65 for amplifying the user's voice signal c2, and a voltage source 64 that powers the two amplifiers 63, 65. Moreover, a first variable resistor serving as the volume control switch 61 and a second variable resistor serving as the tone control switch 62 are provided preceding the first amplifier 63, which allow the user to adjust the volume and tone levels of the incoming voice signal c1.

Since the telephone converter according to the invention is a low-power-consumption device, the voltage source 64 can be a small-size lithium battery.

Furthermore, as shown in FIG. 2, the casing 66 is provided with at least three connectors, such as sockets including a first socket 6a, a second socket 6b, and a third socket 6c. The first socket is used for reception of a plug 71 on the headset 7, allowing the user to use the handset 9 via the telephone converter 10. The second socket 6b is used for connection with a loudspeaker (not shown), so as to allow the incoming voice to be broadcast throughout a room when necessary. The third socket 6c is used for connection with a tape recorder (not shown) so as to record the dialog on the telephone when necessary.

The headset 7 comprises a plug 71, a wire strand 74, a microphone 72, a wire 75, and an earphone 73. The plug 71 can be inserted into the socket 6a on the casing 66 of the control unit 6 so as to allow the microphone 72 and the earphone 73 on the headset 7 to be coupled via the telephone converter 10 respectively to the transmitter 2 and the receiver 1 of the handset 9. The microphone 72 preferably is an in-line type of microphone. The user can utter his/her voice into the microphone 72 to let his/her voice be transmitted via the wire strand 74 to the control unit 6 and subsequently via the speaker unit 5b to the transmitter 2 of the handset 9. The earphone 73 preferably is of the usual plug-into-the-ear type which receives the incoming voice from the receiver 1 via the microphone unit 5a and the control unit 6 and reproduces the incoming voice for the user to hear.

To operate the telephone converter 10, the user first adheres the female adhesive pieces 31, 41 respectively onto the receiver 1 and transmitter 2 in the handset 9 and the male adhesive pieces 32, 42 respectively onto the microphone unit 5a and speaker unit 5b, then engage the female adhesive piece 31 with the male adhesive piece 32 and also the female adhesive piece 41 with the male adhesive piece 42. Since these four pieces 31, 32, 41, 42 are each provided with a circular hole in the center, sound waves will be transmitted, free of obstruction, from the receiver 1 to the microphone unit 5a and also from the speaker unit 5b to the transmitter 2. Further, since the microphone unit 5a and speaker unit 5b are respectively connected to separate wires 51, 52, their mounting on the handset 9 will not be restrained by variations in the distance between the receiver 1 and the transmitter 2 of the handset 9 (due to variations in design of different handsets). When the handset 9 is hung up, these connections will provide good contact between the microphone unit 5a and the receiver 1 and between the speaker unit 5b and the transmitter 2. After that, the user inserts the plug 71 on the headset 7 into the socket 6a on the control unit 6. Then the user can speak on the telephone via the microphone 72 and the earphone 73 on the headset 7.

To adjust the volume and tone levels of the incoming voice if necessary, the user merely turns the volume control switch 61 and the tone control switch 62 respectively on the control unit 6. This provision allows the user, particularly the hearing-impaired, to raise the volume level of the incoming voice so the user can hear the incoming voice more clearly.

To record the dialog on the telephone, the user can connect a tape recorder, for example, via the socket 6c on the control unit 6. To allow several persons in a room to hear a telephone conversation, the user can connect a loudspeaker (not shown) to the socket 6b so that the incoming voice is broadcast throughout the room.

It is an advantage of the invention that, since the user can speak on the telephone without having to hold the handset by hand, the telephone conversation can proceed in a more comfortable manner and the user's hands are free to do other work if necessary.

In summary, the telephone converter according to the invention has the following benefits. First, it can be used in conjunction with any type of phone set, whether wired or wireless, and even public pay telephone. When using a public pay phone set, the user needs simply to adhere the first coupler 3 and the second coupler 4 respectively as depicted in FIG. 2. After use, the telephone converter 10 can be easily dismounted from the public pay phone set by simply pulling the couplers 3, 4 off somewhat forcibly by hand. Second, the telephone converter is easy to mount and dismount. The mounting needs no wire connection with or modifications to the phone set so that there is no need to apply to the local telecommunication authority for approval. Third, using the telephone converter according to the invention, the user can use a telephone absolutely hands-free. The user thus can convenient talk on the telephone whether driving in a car, doing housework at home, or working in the office. Fourth, the telephone converter according to the invention employs a headset that has an earphone plugged into the ear so that privacy of the telephone conversation is assured. Fifth, the headset has a mouthpiece microphone unit that can be positioned close to the mouth. This can prevent background noise from entering the mouthpiece microphone unit, thereby allowing clearer sound reproduction on the other side. Sixth, for the hearing-impaired, the telephone converter according to the invention not only provides the aforementioned benefits, but also allows them to adjust the volume of the incoming voice to a suitable level, so they are able to hear the incoming voice clearly.

The invention has been described with exemplary preferred embodiment. However, it to be understood that the scope of the invention need not be limited to the disclosed embodiment. To the contrary, the invention is intended to cover various modifications and similar arrangements as would be apparent to persons skilled in the art, and being limited only by the appended claims which should be accorded the broadest interpretation.

What is claimed is:

1. A telephone converter for use with a telephone handset having a handset transmitter for transmitting a user's voice signal and a handset receiver for receiving an incoming sound signal, the telephone converter comprising:

(a) first coupling means for adhesive connection to the handset receiver;

(b) second coupling means for adhesive connection to the handset transmitter;

(c) converting means, coupled to the handset via said first coupling means and said second coupling means, for receiving the incoming sound signal from the handset receiver and providing the user's voice to the handset transmitter; and (d) control means, coupled to said converting means, for amplifying the user's voice signal and for amplifying the incoming sound signal received by said converting means from the handset receiver.

2. A telephone converter as claimed in claim 1, wherein said first coupling means comprises:

(i) a first female adhesive piece having a rear side coated with a removable adhesive agent for adhering said first female adhesive piece onto the handset receiver and a front side layered with a soft material; and (ii) a first male adhesive piece having a rear side coated with a removable adhesive agent for adhering said first male adhesive piece onto said converting means and a front side provided with a plurality of hooks for engagement by hooking with the front side of said first female adhesive piece; and said second coupling means comprises:

(i) a second female adhesive piece having a rear side coated with a removable adhesive agent for adhering said second female adhesive piece onto the handset transmitter and a front side layered with a soft material; and (ii) a second male adhesive piece having a rear side coated with a removable adhesive agent for adhering said second male adhesive piece onto said converting means and a front side provided with a plurality of hooks for engagement by hooking with the front side of said second female adhesive piece.

3. A telephone converter as claimed in claim 1, wherein said converting means comprises:

(i) a microphone unit, coupled to said first male adhesive piece, for picking up the incoming sound from the handset receiver;

(ii) a speaker unit, coupled to said second male adhesive piece, for reproducing the user's voice signal to the handset transmitter; and (iii) a wire strand including a first wire and a second wire, the first wire connecting said microphone unit to said control means, the second wire separating from said first wire at a separation point and connecting said speaker unit to said control means.

4. A telephone converter as claimed in claim 3, wherein said first wire is connected to a lateral side of said microphone unit.

5. A telephone converter as claimed in claim 3, wherein said second wire is connected to a lateral side of said speaker unit.

6. A telephone converter as claimed in claim 3, wherein said converting means comprises means for combining said first wire and said second wire into said wire strand.

7. A telephone converter as claimed in claim 6, wherein said combining means comprises a fastener at said separation point.

8. A telephone converter as claimed in claim 3, wherein said control means comprises:

(i) a casing having a socket for connection with said headset for transmission of the incoming sound signal and the user's voice signal;

(ii) a volume control means for adjusting the volume level of the incoming sound signal from said microphone unit; and (iii) a tone control means for adjusting the tone level of the incoming sound signal from said microphone unit.

9. A telephone converter as claimed in claim 8, wherein said headset comprises:

(i) an earphone for user's ear to hear the incoming sound amplified by said control means; and (ii) a mouthpiece microphone unit for receiving the user's voice that is to be transmitted via said control means to the handset.

10. A telephone converter as claimed in claim 9, wherein said control means comprises:

(i) a first amplifier for amplifying the incoming sound signal from said microphone unit, and directing the amplified incoming sound signal to said earphone;

(ii) a second amplifier for amplifying the user's voice signal from said mouthpiece microphone unit, and directing the amplified user's voice signal to said speaker unit; and (iii) a voltage source for powering said first amplifier and said second amplifier; and wherein said volume control means comprises a first variable resistor and said tone control means comprises a second variable resistor.

11. A telephone converter for use with a headset and a telephone handset having a handset transmitter for transmitting a user's voice signal and a handset receiver for receiving an incoming sound signal, the telephone converter comprising:

(a) first coupling means for adhesive connection to the handset receiver;

(b) second coupling means for adhesive connection to the handset transmitter;

(c) a microphone unit, coupled to said first coupling means, for picking up the incoming sound from the handset receiver;

(d) a speaker unit, coupled to said second coupling means, for reproducing the user's voice signal to the handset transmitter; and (e) control means, coupled to said converting means, for amplifying the user's voice signal and for amplifying the incoming sound signal received by said converting means from the handset receiver.

12. A telephone converter as claimed in claim 11, wherein said control means comprises:

(i) a casing having a socket for connection with said headset for transmission of the incoming sound signal and the user's voice signal;

(ii) a volume control means for adjusting the volume level of the incoming sound signal from said microphone unit; and (iii) a tone control means for adjusting the tone level of the incoming sound signal from said microphone unit.

13. A telephone converter as claimed in claim 12, wherein said headset comprises:

(i) an earphone for user's ear to hear the incoming sound amplified by said control means; and (ii) a mouthpiece microphone unit for receiving the user's voice that is to be transmitted via said control means to the handset.

14. A telephone converter as claimed in claim 13, wherein said control means comprises:

(i) a first amplifier for amplifying the incoming sound signal from said microphone unit, and directing the amplified incoming sound signal to said earphone;

(ii) a second amplifier for amplifying the user's voice signal from said mouthpiece microphone unit, and directing the amplified user's voice signal to said speaker unit; and (iii) a voltage source for powering said first amplifier and said second amplifier; and wherein said volume control means comprises a first variable resistor and said tone control means comprises a second variable resistor.

* * * * *